May 1, 1962 H. SCHLENZ 3,032,402
APPARATUS FOR THE ANALYSIS OF FLUE GAS AND PROTECTIVE GAS
Filed Feb. 24, 1958 2 Sheets-Sheet 1

United States Patent Office 3,032,402
Patented May 1, 1962

3,032,402
APPARATUS FOR THE ANALYSIS OF FLUE GAS AND PROTECTIVE GAS
Hans Schlenz, Frankfurt am Main Praunheim, Germany, assignor to Hartmann & Braun Aktiengesellschaft, Frankfurt am Main, Germany, a corporation
Filed Feb. 24, 1958, Ser. No. 717,006
Claims priority, application Germany Mar. 5, 1957
5 Claims. (Cl. 23—255)

This invention relates to a process and instrument for the analysis of flue gases and protective gases. The main purpose of the invention is to provide an equipment enabling the accurate analysis of flue gases or exhaust gases of internal combustion engines. When testing flue gases or exhaust gases from fuel combustion or internal combustion engines it is most important that the gas analyser renders possible the determination of all unburnt constituents in the flue gas, such as CO, methane, hydrogen etc. A fully efficient measurement is not possible with the flue gas analysers known so far. Furthermore it is also important to know the excess oxygen contained in the flue gas. Only when there is an exact determination of these two constituents, the excess oxygen contained in the flue gas and the unburnt constituents, definite conclusions can be reached as to the efficiency of combustion in the furnace or motor to be supervised. If the flue gas contains unburnt constituents, this means an insufficient exploitation of the fuel and the plant is not operated economically. An excess of oxygen in the flue gas or exhaust gas also means an uneconomical operation because the combustion takes place with too much excess air, the heating of which is also uneconomical. Up till now for the flue gas analysis of combustion processes it was though sufficient to measure either the excess oxygen or the content of unburnt constituents. The simultaneous measurement of the excess oxygen and the unburnt components would have resulted in the necessity of employing two separate gas analysers. Hence the invention has also the purpose of providing one simple and robust equipment for determining the excess oxygen contained in the flue gas and the percentage of unburnt but combustible constituents. The invention furthermore enables the simultaneous measurement of flue gas or protective gas with respect to unburnt components and oxygen by using one comparatively small and simple equipment.

Furthermore the invention provides an apparatus for testing flue gases with maximum dependability and a high resistance to aging. The equipment furthermore offers the advantage of simultaneous data on the calorific value of the unburnt but combustible components contained in the gas to be examined and on the content of excess oxygen which may be present in the flue gas.

Figure 1:
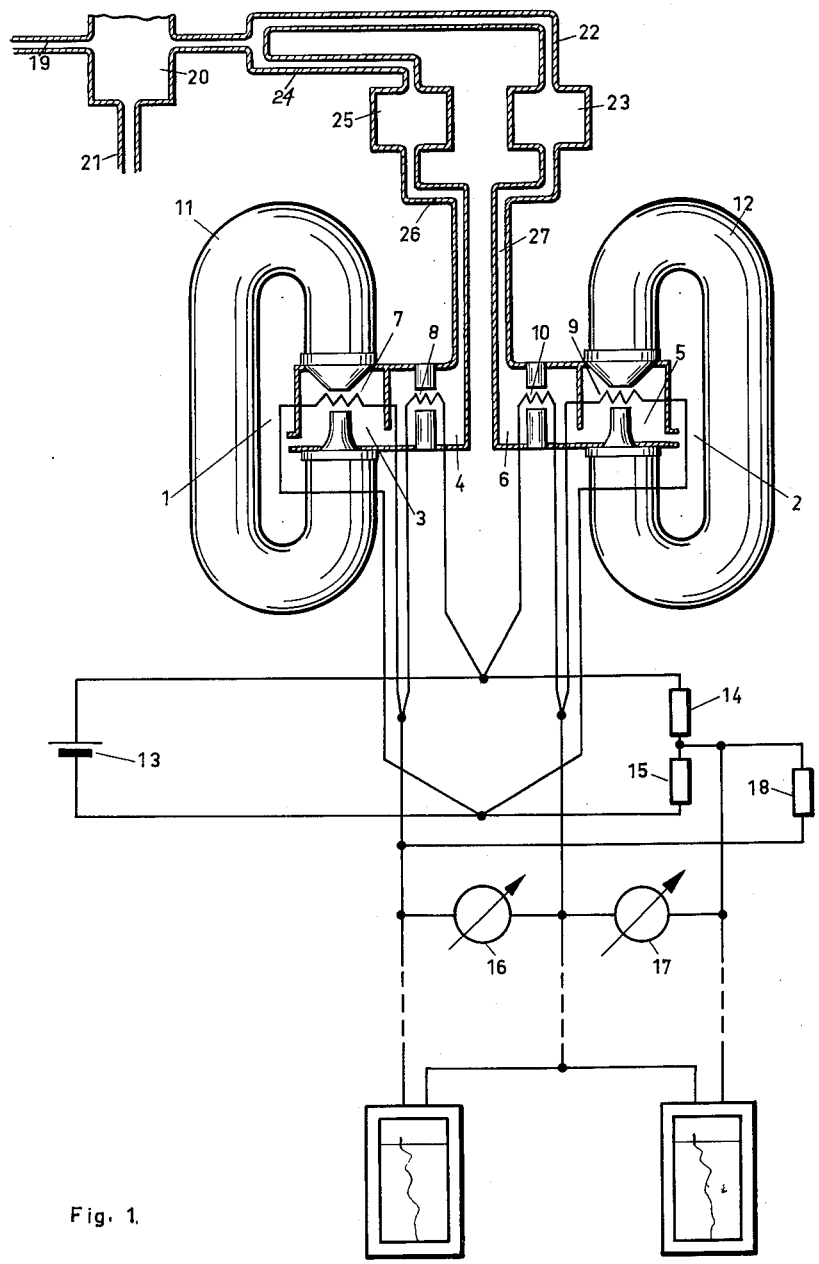
Figure 2:
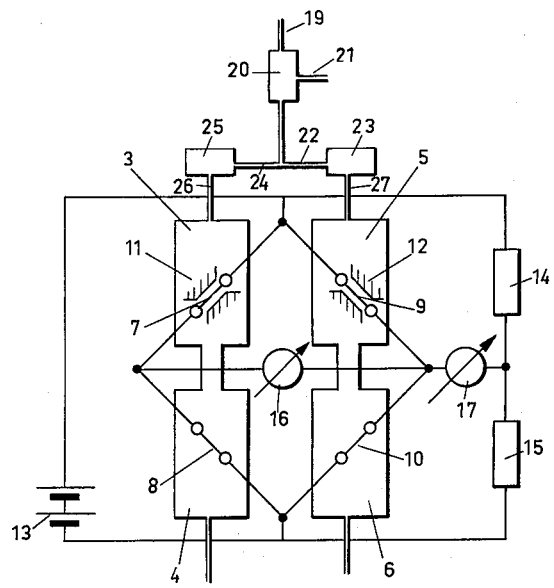
Figure 3:
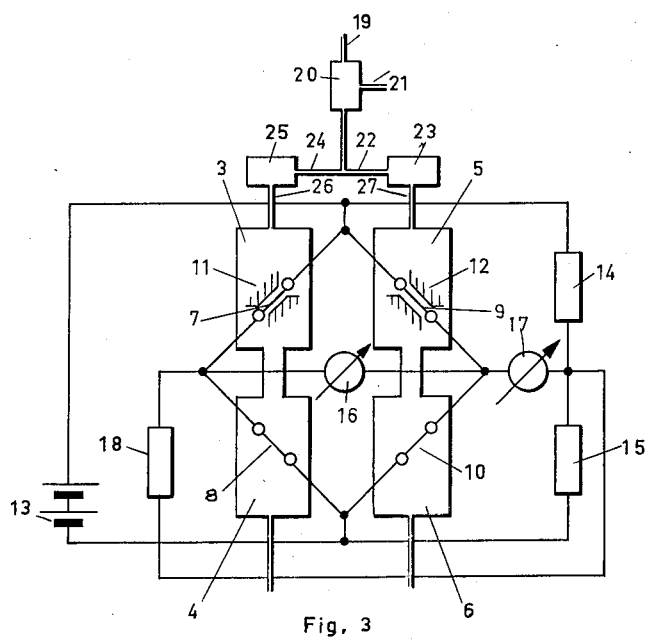

The apparatus employing the invention is fully described below by referring to the relevant drawings. FIG. 1 shows a diagram of a design employing the invention. FIG. 2 shows schematically the circuit arrangement of a simpler design of the apparatus shown in FIG. 1, whereas FIG. 3 represents a schematic circuit diagram of the type shown in FIG. 1.

Explanations are first given for FIG. 1 which shows two apparatus for analysing paramagnetic constituents in a gas to be examined, such apparatus being generally known as "magnetic oxygen tester" and denoted 1 and 2. Each equipment comprises two chambers 3, 4 and 5, 6 with each one heated wire 7, 8 and 9, 10. Chambers 3 and 4 as well as 5 and 6 are connected with each other with the same gas sample flowing through them. Magnet 11 produces an inhomogeneous magnetic field in chamber 3, whereas magnet 12 produces an inhomogeneous magnetic field in chamber 5. The four heated wires 7, 8, 9 and 10 are arranged electrically so as to form a bridge circuit. The bridge is fed by current source 13 at the points where heated wires 8, 10 and 7, 9 are connected with each other. Two series resistors 14 and 15 are also connected to the feeding points of the heated wire bridge, i.e. where the heated wire bridge is connected to the hot-wire voltage source 13. An ammeter or voltmeter 16 is inserted between the corners of the heated wire bridge where the heated wire resistors 7, 8 and 9, 10 are connected to each other. Another electric measuring instrument 17 is connected between the junction of the two heated wires 9 and 10 and the junction of resistors 14 and 15. Resistance 18 is arranged between the junction of heated wires 7 and 8 and the junction of resistors 14 and 15. The gas to be analysed is drawn from the sampling point to the analyser via pipe 19. Dosing device 20 supplies, if necessary, a definite ratio of oxygen or atmospheric air to the gas to be analysed, such air entering the dosing device 20 through line 21.

From dosing device 20 a partial flow of the gas to be analysed is fed to reaction chamber 25 through line 24 for starting a combustion of the unburnt constituents with the oxygen present. After the combustion the gas leaves combustion chamber 25 through line 26, enters gas analyser 1 with measuring chambers 3 and 4 from where it escapes into the open air. Another partial current of the gas to be analysed mixed with air flows through line 22 into compensation chamber 23 and from there via line 27 into analyser 2 with chambers 5 and 6 from where it also escapes into the open air.

Consequently the gas flowing through chambers 5 and 6 of gas analyser 2 is identical with the gas aspirated at the sampling point of the furnace to be supervised with the exception of an admixture, if necessary, of a definite constant percentage of oxygen by means of dosing device 21. This gas flows around the two heated wires 9 and 10 in chambers 5 and 6 of the analyser and since heated wire 9 is arranged in an inhomogeneous magnetic field, which is not the case for heated wire 10, a so-called magnetic wind is produced in the vicinity of heated wire 9 if the gas to be analysed contains oxygen, whereas in the vicinity of heated wire 10 only a usual thermal convection is produced as it is also the case in the vicinity of heated wire 9. Due to the magnetic wind the heated wire 9 is exposed to a more efficient cooling than heated wire 10. The difference of cooling between heated wires 9 and 10 is a function of the oxygen content of the measuring gas. However the gas flowing through chambers 3 and 4 of analyser 1 corresponds no longer to the composition of the gas aspirated at the sampling point because a certain percentage of oxygen has been added and part of the oxygen in combustion chamber 25 has been used for the combustion of combustible constituents contained in the measuring gas. This gas surrounds in chambers 3 and 4 the heated wires 7 and 8 of which one, i.e. heated wire 7, is arranged in an inhomogeneous magnetic field, which is not the case for heated wire 8. Due to the magnetic wind produced in the inhomogeneous magnetic field in the presence of paramagnetic constituents, i.e. oxygen, the heated wire 7 is again cooled more than heated wire 8. The temperature difference between the two heated wires corresponds to the content of oxygen of the gas flowing from the combustion chamber through line 26 into the measuring chambers 3 and 4. Consequently in gas analyser 2 the oxygen content of the original gas or the gas having a certain additional percentage of air is measured, whereas in analyser 1 the oxygen content of the gas with added air after the combustion of the combustible components is determined. The difference of oxygen content in the original gas and in the gas after the combustion of the burnable components measured in analysers 1 and 2 results in a diagonal voltage of the measuring bridge and may be read off the instrument 16. The indication of instrument 16 not only corresponds to the decrease of oxygen in the gas due to the combustion of unburnt components, but also to the percentage of unburnt combonents in the measuring gas. The indication of instrument 16 may also be interpreted as a measure of the calorific value of the unburnt combustible substances contained in the measuring gas and thus as a measure of the instantaneous economy of the plant which has to be supervised.

However when supervising the combustion and internal combustion engines it is not sufficient to know the content of unburnt components in the measuring gas but also the content of excess oxygen contained in the gas must be known. For rendering possible also the determination of the oxygen contained in the measuring gas by means of the apparatus of the invention, two resistors 14 and 15 connected in parallel and corresponding approximately to the resistance of heated wires 9 and 10 have been arranged in parallel to heated wires 9 and 10 in chambers 5 and 6 of gas analyser 2. The junction of resistances 14 and 15 is connected across measuring instrument 17 to the junction of hot-wire resistances 9 and 10. Resistance 18 connects the junction of resistances 14 and 15 to the junction of hot-wire resistances 7 and 8. The value of resistance 18 corresponds approximately to the resistance of instruments 17. Due to the above mentioned equivalent circuit the absolute content of oxygen in the measuring gas is also indicated by the arrangement of the invention. If to the original gas in line 19 oxygen or air is added with a definite proportion by means of dosing device 20, the added quantity of oxygen must be considered when measuring the oxygen content by means of instrument 17. This is achieved by suppressing the zero point of instrument 17 by the percentage of oxygen led in at 20.

FIGS. 2 and 3 are once more a clear schematic representation of the circuit arrangement of the flue gas analyser of the invention. The mechanical components are shown schematically in order to give a better view of the electric circuit. The various components are denoted with the same references as in FIG. 1. FIG. 2 shows a somewhat simplified arrangement, whereas FIG. 3 corresponds exactly to the shown example of FIG. 1 as concerns the circuitry. The measuring gas again enters the analyser at 19, part of it flowing to reaction chamber 25 after the admixture of air and the other part flowing through compensation chamber 23. From reaction chamber 25 the gas passes chambers 3 and 4 of analyser 1 with heated wires 7 and 8, whereas the other partial gas flow coming from the compensation chamber flows into the chambers of analyser 2 with heated wires 9 and 10. The diagonal voltage of the bridge consisting of heated wires 7, 8, 9 and 10 is indicated by instrument 16 and according to the above explanations corresponds to the content of unburnt combustible components in the measuring gas. By means of the auxiliary bridge comprising fixed resistors 14 and 15 in conjunction with heated wires 9 and 10 it is also possible to determine the absolute content of oxygen in the measuring gas because heated wires 9 and 10 are surrounded by the original gas. The absolute oxygen content is indicated by instrument 17. In this simplified arrangement the resistance of instrument 16 influences the measurement of the absolute oxygen content by means of instrument 17, whereas the resistance of instrument 17 influences the indication of the content of unburnt components by means of instrument 16. Therefore as shown in FIG. 3, an additional resistance 18 may be provided which is connected between the junction of the two heated wires 7 and 8 and the junction between resistances 14 and 15. Irrespective of this feature, the arrangement of FIG. 3 corresponds exactly to that of FIG. 2. When choosing accordingly the values for resistance 18 which is supposed to be approximately the same as for instruments 16 and 17, accurate simultaneous measurements of the content of unburnt components and oxygen in the measuring gas are also achieved by means of instruments the resistance of which is not extremely high. However for the arrangement of FIG. 2 electrical instruments are to be used as indicators the resistance of which is as high as possible, e.g. potentiometric measuring instruments.

I claim:

1. An apparatus for analysing flue gas and protective gas for combustible or reducing substances comprising first and second magnetic oxygen analysers each containing two heated wires, one in an inhomogeneous magnetic field and another in a space without magnet field, the four heated wires being connected in an electric bridge fed by a current source, an electric measuring instrument for determining the diagonal voltage of the heated wire bridge, two resistances arranged in series and connected across the current source for feeding the heated wire bridge, another electrical measuring instrument connected with one point of the bridge diagonal of said second analyser and the junction of said two resistances, means for dividing the gas flow into two partial flows, a combustion chamber for burning the unburnt components of the flue gas in one partial flow, means for feeding this partial flow to the first magnetic oxygen analyser, and means for feeding the second partial flow to the second magnetic oxygen analyser.

2. An apparatus for analysing flue gas and protective gas for combustible or reducing substances comprising first and second magnetic oxygen analysers each containing two heated wires, one in an inhomogeneous magnetic field and another in a space without magnetic field, the four heated wires being connected in an electric bridge fed by a current source, an electric measuring instrument for determining the diagonal voltage of the heated wire bridge, two resistances arranged in series and connected across the current source for feeding the heated wire bridge, another electrical measuring instrument connected with one point of the bridge diagonal of said second analyser and the junction of said two resistances, means for dividing the gas flow into two partial flows, a combustion chamber for burning the unburnt components of the flue gas in one partial flow, means for feeding this partial flow to the first magnetic oxygen analyser after passing the chamber, and means for feeding the second partial flow to the second magnetic oxygen analyser.

3. An apparatus for analysing flue gas and protective gas for combustible or reducing substances comprising first and second magnetic oxygen analysers each containing two heated wires, one in an inhomogeneous magnetic field and another in a space without magnetic field, the four heated wires being connected in an electric bridge fed by a current source, an electric measuring instrument for determining the diagonal voltage of the heated wire bridge, two resistances arranged in series and connected across the current source for feeding the heated wire bridge, another electrical measuring instrument connected with one point of the bridge diagonal of said second analyser, and the junction of said two resistances, a third resistance having a value substantially equal to that of one of said measuring instruments and connected to the opposite point of the diagonal and to said junction, means for dividing the gas flow into two partial flows, a combustion chamber for burning the unburnt components of the flue gas in one partial flow, means for feeding this partial flow to the first magnetic oxygen analyser and means for feeding the second partial flow to the second magnetic oxygen analyser.

4. An apparatus for analysing flue and exhaust gases comprising, a sampling line for the gas, means for dividing the flow of gas in the sampling line into two branch lines, a combustion chamber in one branch line and a compensating chamber in the other branch line, first and second magnetic oxygen analysers in the respective branch lines and adapted to receive the exit gases from the chambers, said first and second analysers each containing two heated wires, one in an inhomogeneous magnetic field and another in a space without magnetic field, said four heated wires being connected in an electric bridge fed by a current source, an electric measuring instrument for determining the diagonal voltage of the heated wire bridge, two resistances arranged in series and connected across the current source for feeding the heated wire bridge, and another electrical measuring instrument connected with one point of the bridge diagonal of said second analyser and the junction of said two resistances.

5. An apparatus for analysing flue and exhaust gases comprising a sampling line, a mixing chamber, a branching duct having outlet legs, all in series and such order, means for introducing oxygen into the mixing chamber, first and second magnetic oxygen analysers connected respectively to two of said legs, a combustion chamber interposed in one and a compensating chamber in the other of the two legs, each analyser having a pair of gas chambers connected together and a heated wire in each chamber, one gas chamber having an inhomogeneous magnetic field therein and the other a space without magnetic field, the four heated wires being connected in an electric bridge fed by a current source, an electric measuring instrument for determining the diagonal voltage of the heated wire bridge, two resistances arranged in series and connected across the current source for feeding the heated wire bridge, another electrical measuring instrument connected with one point of the bridge diagonal of said second analyser and the junction of the two resistances, and a third resistance having a value substantially equal to that of one of said measuring instruments and connected to the opposite point of the diagonal and to said junction between said two resistances for preventing current drawn by one instrument from affecting that drawn by the other and so make the readings of the two instruments independent from each other.

References Cited in the file of this patent

UNITED STATES PATENTS

| | | |
|---|---|---|
| 1,644,951 | Rodhe | Oct. 11, 1927 |
| 2,591,761 | Zaikowsky | Apr. 8, 1952 |
| 2,633,737 | Richardson | Apr. 7, 1953 |
| 2,944,418 | Engelhardt | July 12, 1960 |

FOREIGN PATENTS

| | | |
|---|---|---|
| 724,041 | Germany | Aug. 17, 1942 |